US 6,698,182 B2

(12) United States Patent
Sonoda et al.

(10) Patent No.: US 6,698,182 B2
(45) Date of Patent: Mar. 2, 2004

(54) GAS TURBINE COMBINED PLANT

(75) Inventors: Takashi Sonoda, Hyogo (JP); Kazuya Higashi, Hyogo (JP); Tomoka Tanaka, Hyogo (JP); Kunifumi Yamasaki, Hyogo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 10/117,080

(22) Filed: Apr. 8, 2002

(65) Prior Publication Data

US 2002/0144505 A1 Oct. 10, 2002

(30) Foreign Application Priority Data

Apr. 10, 2001 (JP) .................................... 2001-111907

(51) Int. Cl.[7] ................................................. F02C 6/00
(52) U.S. Cl. ..................................... 60/39.182; 60/39.3
(58) Field of Search ..................... 60/39.182, 39.181, 60/39.183, 39.3, 806, 730

(56) References Cited

U.S. PATENT DOCUMENTS

| 4,932,204 | A | | 6/1990 | Pavel et al. | 60/39.182 |
|---|---|---|---|---|---|
| 5,357,746 | A | | 10/1994 | Myers et al. | 60/39.182 |
| 5,386,687 | A | * | 2/1995 | Frutschi | 60/39.17 |
| 6,018,942 | A | * | 2/2000 | Liebig | 60/39.182 |
| 6,089,012 | A | * | 7/2000 | Sugishita et al. | 60/39.182 |
| 6,212,873 | B1 | * | 4/2001 | Sugishita et al. | 60/39.182 |
| 6,223,523 | B1 | * | 5/2001 | Frutschi | 60/39.182 |
| 6,244,039 | B1 | * | 6/2001 | Sugishita et al. | 60/39.182 |
| 6,389,797 | B1 | * | 5/2002 | Sugishita et al. | 60/39.182 |
| 6,530,208 | B1 | * | 3/2003 | Sugishita et al. | 60/39.182 |

FOREIGN PATENT DOCUMENTS

| CA | 2093185 | 10/1993 | ................ 60/39.17 |
|---|---|---|---|
| EP | 0 709 561 A | 5/1996 | |
| JP | 2-283803 | 11/1990 | ............. 60/39.182 |
| JP | 6-10706 | 1/1994 | ................ 60/39.17 |
| JP | 6 330709 A | 3/1995 | |
| JP | 7-208116 | 8/1995 | ............. 60/39.182 |
| JP | 8-260913 | 10/1996 | |
| JP | 10-18809 | 1/1998 | |
| JP | 10-196316 | 7/1998 | |
| JP | 10 196316 A | 10/1998 | |
| JP | 11-117712 | 4/1999 | |
| JP | 11-117714 | 4/1999 | |
| JP | 11 173111 A | 9/1999 | |
| JP | 2001 280103 A | 4/2002 | |

* cited by examiner

*Primary Examiner*—Thomas Denion
*Assistant Examiner*—Thai-Ba Trieu
(74) *Attorney, Agent, or Firm*—Oblon, Spivak, McClelland, Maier & Neustadt, P.C.

(57) ABSTRACT

In the gas turbine combined plant, water fed to an entrance of a high-pressure economizer is guided into an air cooler as a cooling medium of high-temperature air that passes through the air cooler. High-temperature water obtained by heat exchanging with high-temperature air is branched to a passage that joins water drawn from an exit of the high-pressure economizer and a passage that joins a condenser. These passages are provided with regulating valves that regulate the flow rate of the water that passes through these passages, respectively.

7 Claims, 5 Drawing Sheets

GAS TURBINE COMBINED PLANT

FIELD OF THE INVENTION

The present invention relates to a gas turbine combined plant which comprises a gas turbine section that has an air cooler, and a steam turbine section that has a waste-heat recovery boiler. More particularly, the invention relates to a gas turbine combined plant which has an improved air cooler that uses water of a waste-heat recovery boiler.

BACKGROUND OF THE INVENTION

The gas turbine compresses air with an air compressor, sends this air to a combustor, heats and combusts obtained compressed air together with a fuel in the combustor, thereby to produce high-temperature and high-pressure gas. The gas turbine expands the high-temperature and high-pressure gas in a turbine to drive the turbine, and obtains power of a generator.

From a viewpoint of improving the efficiency of the gas turbine, it is necessary to suppress a leakage of the gas in the turbine as far as possible. For this purpose, a clearance between a moving section (a moving blade or the like) and a stationary section (a casing that covers the moving blade from an external periphery side) is designed as small as possible.

On the other hand, from a viewpoint of increasing the thermal efficiency of the gas turbine, the operation gas temperature is set to a high level. In order to secure the clearance at this high temperature, it is important to suppress thermal expansion by effectively cooling members of the turbine that become at a high temperature (hereinafter, referred to as a high-temperature members).

For this purpose, the gas turbine is provided with an air cooler that cools the high-temperature air obtained by extracting this air from the air compressor, and supplies this cooled air for cooling the high-temperature members.

Further, in order to effectively utilize the waste heat of an exhaust gas exhausted from the gas turbine, a gas turbine combined plant is put to practical use. This gas turbine combined plant sends this exhaust gas to a waste-heat recovery boiler, drives a steam turbine by using steam obtained from the waste-heat recovery boiler, and obtains power for other generators.

This gas turbine combined plant condenses the steam exhausted by driving the steam turbine with a condenser, and supplies obtained water to the waste-heat recovery boiler. The exhaust gas from the gas turbine section is radiated by passing through a superheater, an evaporator, and an economizer in this order, within the waste-heat recovery boiler. In the mean time, water supplied from the condenser flows through the economizer, the evaporator, and the superheater in this order, thereby to absorb the heat. The waste heat from the gas turbine section is effectively utilized in this way.

Further, a cooling water passage is provided such that a part of the water to the waste-heat recovery boiler is returned to a process as explained below. That is, the part of the water to the waste-heat recovery boiler is guided into the air cooler as a cooling medium that cools the high-temperature air that has been guided to the air cooler of the gas turbine section. The water that has become at a high temperature after heat exchanging with the high-temperature air is returned to the process in which the water of the waste-heat recovery boiler has a higher temperature. In this way, a structure for efficiently carrying out the heat recovery is provided.

According to the above gas turbine combined plant, a pressure of a process (for example, a drum) that leads to a secondary side of the cooling water passage (a side at which water returns from the air cooler to the waste-heat recovery boiler) becomes high, at a starting time of the steam turbine or at a load disconnection time. Therefore, a relative pressure difference between a primary side (a side at which water is guided from the waste-heat recovery boiler to the air cooler) and the secondary side of the cooling water passage becomes small. As a result, a quantity of the water that flows through the air cooler is reduced, and there is a risk that the cooling of high-temperature air may become insufficient.

SUMMARY OF THE INVENTION

It is an object of this invention to obtain a gas turbine combined plant which can stably cool high-temperature air of a gas turbine, in various kinds of operation status like a steam turbine starting time and a load disconnection time other than a normal operation time.

The gas turbine combined plant according to one aspect of this invention comprises a gas turbine section and a steam turbine section. The gas turbine section includes an air compressor, a combustor, a gas turbine, and an air cooler that cools high-temperature air obtained by being extracted from the air compressor and supplies cooled air for cooling high-temperature members in the gas turbine. The steam turbine section includes a waste-heat recovery boiler that generates steam based on waste heat of an exhaust gas exhausted from the gas turbine, a steam turbine that is driven by the steam, and a condenser that condenses steam exhausted from the steam turbine into water and supplies the water to the waste-heat recovery boiler. The gas turbine combined plant also comprises a cooling water passage that guides a part of the water from the waste-heat recovery boiler into the air cooler, allows heat-exchange between the water and the high-temperature air, and returns the water after this heat exchange to the waste-heat recovery boiler. The gas turbine combined plant further comprises a branch passage that guides the water after the heat exchange to the condenser, and a regulating valve that regulates a quantity of the water that flows through the branch passage.

The gas turbine combined plant according to another aspect of this invention comprises a gas turbine section and a steam turbine section. The gas turbine section includes an air compressor, a combustor, a gas turbine, and an air cooler that cools high-temperature air obtained by being extracted from the air compressor and supplies cooled air for cooling high-temperature members in the gas turbine. The steam turbine section which includes a waste-heat recovery boiler that generates steam based on waste heat of an exhaust gas exhausted from the gas turbine, a steam turbine that is driven by the steam, and a condenser that condenses steam exhausted from the steam turbine into water and supplies the water to the waste-heat recovery boiler. The gas turbine combined plant also comprises a cooling water passage that guides a part of the water from the waste-heat recovery boiler into the air cooler, allows heat-exchange between the water and the high-temperature air, and returns the water to the waste-heat recovery boiler. The gas turbine combined plant further comprises a bypass passage that guides water at a lower temperature than that of water at a primary side of the cooling water passage into the air cooler, and a switching valve that selectively switches between the primary side of the cooling water passage and the bypass passage.

Other objects and features of this invention will become apparent from the following description with reference to the accompanying drawings.

DETAILED DESCRIPTIONS

Embodiments of the gas turbine combined plant according to the present invention will be explained below with reference to the drawings. It is noted that the present invention is not limited by these embodiments.

Figure 1:
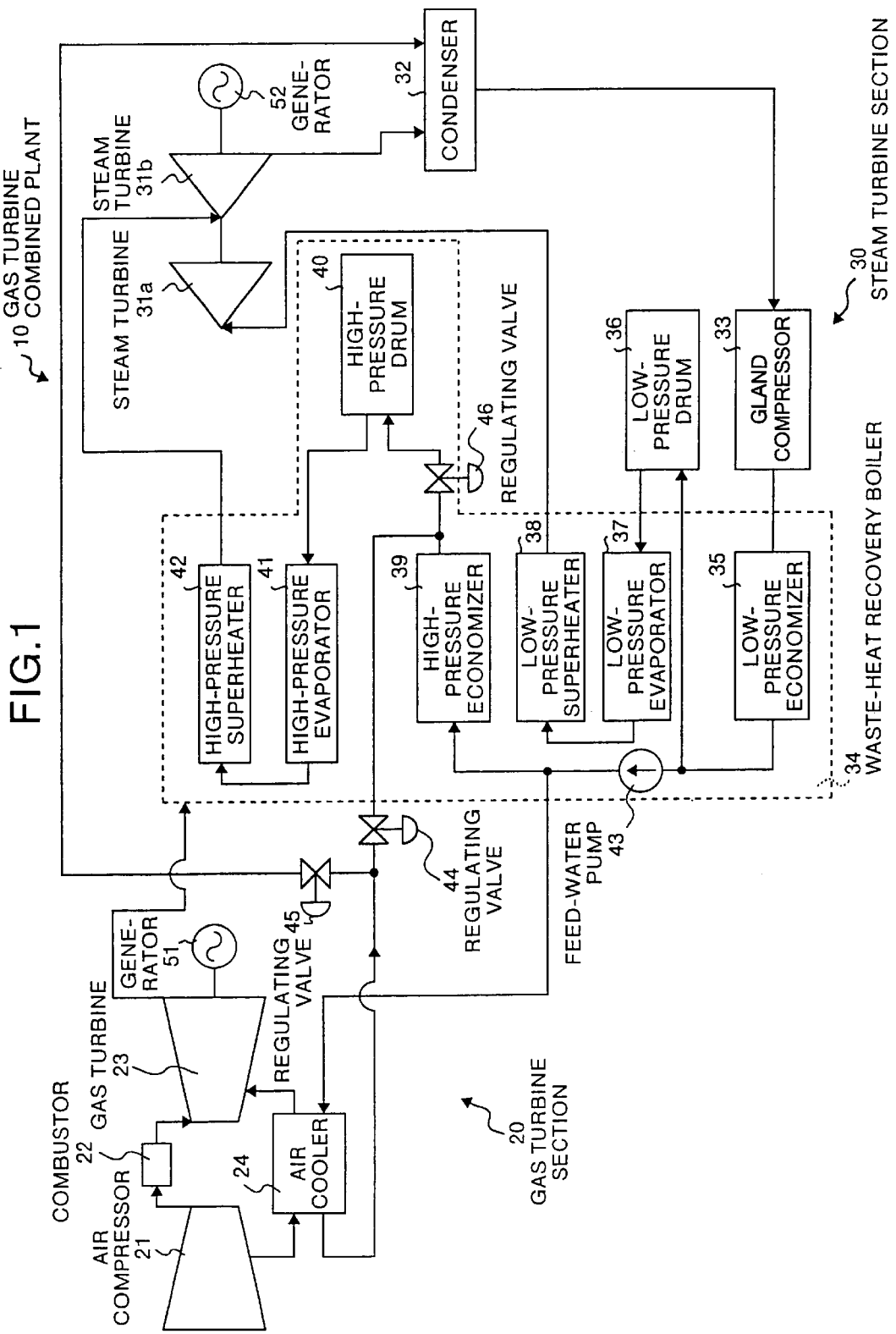
FIG. 1 is a diagram that shows a first embodiment of the gas turbine combined plant according to the present invention.

FIG. 1 is a block diagram that shows a first embodiment of the gas turbine combined plant according to the present invention. A gas turbine combined plant 10 shown in the figure consists of a gas turbine section 20 and a steam turbine section 30. The gas turbine section 20 is constructed of an air compressor 21 that compresses air, a combustor 22 that mixes high-temperature air compressed by the air compressor 21 with a fuel, and combusts the mixture by heating, a gas turbine 23 that is driven to rotate by a combustion gas obtained from the combustor 22, and an air cooler 24 that cools the high-temperature air obtained by being extracted from the air compressor 21, and supplies the cooled air to cool high-temperature members of the gas turbine 23. On the other hand, the steam turbine section 30 is constructed of a waste-heat recovery boiler 34 that generates steam with waste heat of an exhaust gas exhausted from the gas turbine 23, two steam turbines 31a and 31b that are driven by the steam to exhaust the steam, a condenser 32 that condenses the steam exhausted from the steam turbines 31a and 31b, and a gland condenser 33.

The waste-heat recovery boiler 34 is constructed of a low-pressure economizer 35, a low-pressure drum 36, a low-pressure evaporator 37, a low-pressure superheater 38, a high-pressure economizer 39, a high-pressure drum 40, a high-pressure evaporator 41, a high-pressure superheater 42, and a water supply pump 43 that increases the pressure of the water drawn from the exit of the low-pressure economizer 35 to lead the pressurized water to the entrance of the high-pressure economizer 39. Low-pressure superheated steam obtained by superheating with the low-pressure superheater 38 is guided to the steam turbine 31a at a low-pressure side, and high-pressure superheated steam obtained by superheating with the high-pressure superheater 42 is guided to the steam turbine 31b at a high-pressure side, respectively.

The water fed to the entrance of the high-pressure economizer 39 is guided into the air cooler 24 as a cooling medium of high-temperature air that passes through the air cooler 24. High-temperature water obtained by heat exchanging with high-temperature air is branched to a passage that joins the water drawn from the exit of the high-pressure economizer 39 and a passage that joins the condenser 32. These passages are provided with regulating valves 44 and 45 that regulate the flow rate of the water that passes through these passages respectively. A regulating valve 46 is also provided in a water supply passage from the high-pressure economizer 39 to the high-pressure drum 40. Further, a first generator 51 is connected to the gas turbine 23, and a second generator 52 is connected to the steam turbines 31a and 31b.

Next, the operation of the gas turbine combined plant 10 according to the first embodiment will be explained. First, the air compressor 21 of the gas turbine section 20 is driven by rotation, and the air supplied based on the driving of this air compressor 21 is compressed, and is supplied to the combustor 22. The combustor 22 is supplied with the air that has become at a high temperature based on the compression (high-temperature air) and a fuel. A mixture of these is combusted by heating, and becomes a high-temperature high-pressure gas. This gas is supplied to the gas turbine 23. The gas turbine 23 is rotated by the supplied high-temperature high-pressure gas to produce driving force, and this driving force becomes power for the first generator 51.

A part of the air is extracted from the middle of the air compressor 21 to the air cooler 24, and is cooled by this air cooler 24. The cooled air is extracted for high-temperature members like a rotor and a blade of the gas turbine 23, and a casing, and is used to cool these high-temperature members.

On the other hand, the gas (exhaust gas) exhausted from the gas turbine 23 is guided into the waste-heat recovery boiler 34 of the steam turbine section 30. The water guided from the gland condenser 33 into this waste-heat recovery boiler 34 is superheated to obtain steam based on the waste heat of the exhaust gas. This superheated steam is supplied to the steam turbines 31a and 31b respectively to rotate the steam turbines 31a and 31b to produce driving force. This driving force becomes the power for the second generator 52.

The water guided from the gland condenser 33 into the waste-heat recovery boiler 34 is heated by the low-pressure economizer 35, and is branched to the low-pressure drum 36 and the water supply pump 43. The water supplied to the low-pressure drum 36 becomes a saturated steam by the low-pressure evaporator 37, and becomes a superheated steam by the low-pressure superheater 38. The superheated steam is supplied to the steam turbine 31a at the low-pressure side to drive the steam turbine 31a at the low-pressure side.

The water guided to the water supply pump 43 is fed to the high-pressure economizer 39. A part of the water fed to the entrance is supplied to the air cooler 24 to cool the high-temperature air extracted from the air compressor 21. The water that has become at a high temperature by heat exchanging with the high-temperature air is branched to the passage that joins the water drawn from the exit of the high-pressure economizer 39 and the passage that drains the water to the condenser 32. During a normal operation of the steam turbines 31a and 31b, the regulating valve 44 that is provided in the passage that joins the water drawn from the exit of the high-pressure economizer 39 is kept open, and the regulating valve 45 that is provided in the passage that drains the water to the condenser 32 is kept closed. Therefore, all the water from the air cooler 24 joins the water drawn from the exit of the high-pressure economizer 39. At this time, the temperature of the water drawn from the exit of the high-pressure economizer 39 approximately coincides with the temperature of the water that has been drained from the air cooler 24, and efficient thermal recovery is being carried out.

The water drawn from the exit of the high-pressure economizer 39 passes through the opened regulating valve 46 and is supplied to the high-pressure drum 40, and this water becomes a saturated steam by the high-pressure evaporator 41. The saturated steam becomes a superheated steam by the high-pressure superheater 42, and this superheated steam is supplied to the steam turbine 31b to drive the steam turbine 31b. The steam after driving the high-pressure steam turbine 31b is returned to water by the condenser 32, and this water is returned to the gland condenser 33.

The above is the operation during the normal operation of the gas turbine combined plant 10. Next, the operation during the load disconnection of the steam turbines 31a and 31b will be explained.

During the load disconnection of the steam turbines 31a and 31b, the rotation of the steam turbines 31a and 31b stops. Therefore, a pressure at the high-pressure drum 40 side increases, and a pressure difference between the entrance side and the exit side of the high-pressure economizer 39 becomes small, and a flow rate of the water that flows through the high-pressure economizer 39 is reduced. At the same time, a flow rate of the water that flows through the air cooler 24 is also reduced. Consequently, the cooling performance of the air cooler 24 that cools the high-temperature air is lowered, and the air supplied to the high-temperature members of the gas turbine 23 is not cooled sufficiently. As a result, there is a risk that the gas turbine 23 may be damaged due to the thermal expansion of the high-temperature members.

According to the gas turbine combined plant 10 of the present embodiment, the regulating valve 44 provided in the passage that joins the water drawn from the exit of the high-pressure economizer 39 is closed, and the regulating valve 45 provided in the passage that drains the water to the condenser 32 is opened. By controlling the regulating valves 44 and 45 in this way, the pressure difference between the entrance side and the exit side of the air cooler 24 recovers, and the flow rate of the water that flows through the air cooler 24 increases. As a result, it is possible to secure the performance of cooling the high-temperature air.

In other words, in the status that the regulating valve 45 is closed and the regulating valve 44 is opened, the pressure difference between the entrance side and the exit side of the air cooler 24 coincides with the pressure difference between the entrance side and the exit side of the high-pressure economizer 39. Therefore, during the load disconnection, it is not possible to obtain a sufficient pressure difference between the entrance side and the exit side of the high-pressure economizer 39. Consequently, the pressure difference between the entrance side and the exit side of the air cooler 24 also decreases, and the flow rate of the water is reduced. However, in the status that the regulating valve 44 is closed and the regulating valve 44 provided in the passage leading to the condenser 23 that is approximately vacuum is opened, the water at the exit side of the air cooler 24 is absorbed by the condenser 32. Therefore, it is possible to secure a sufficient pressure difference between the entrance side and the exit side of the air cooler 24, regardless of the pressure difference between the entrance side and the exit side of the high-pressure economizer 39. As a result, it is possible to secure a flow rate of the water that flows through the air cooler 24.

In the above explanation, the case of the load of the steam turbines 31a and 31b being disconnected has been explained. It is also possible to secure the cooling performance of the air cooler 24, by operating the steam turbines 31a and 31b in the same manner as that during the load disconnection even in the operation status like the stopping and starting time of the turbines other than the normal operation time (during not a normal operation time).

The regulating valves 44 and 45 may not be in an alternative status of a completely opened status and a completely closed status. Instead, the opening of the regulating valves 44 and 45 may be continuously changed according to a temperature of the air that has been cooled by the air cooler 24, and the opening may be regulated so that the temperature of this air becomes a predetermined temperature.

As explained above, according to the gas turbine combined plant 10 of the present embodiment, during the normal operation time, the water that has passed through the air cooler 24 and has become at a high temperature is drained by joining the exit drawn water of the high-pressure economizer 39, thereby to effectively carry out a thermal recovery. During not a normal operation time, it is possible to sufficiently secure a quantity of the water that flows through the air cooler 24. Therefore, it is possible to prevent insufficient cooling of high-temperature air.

Figure 2:
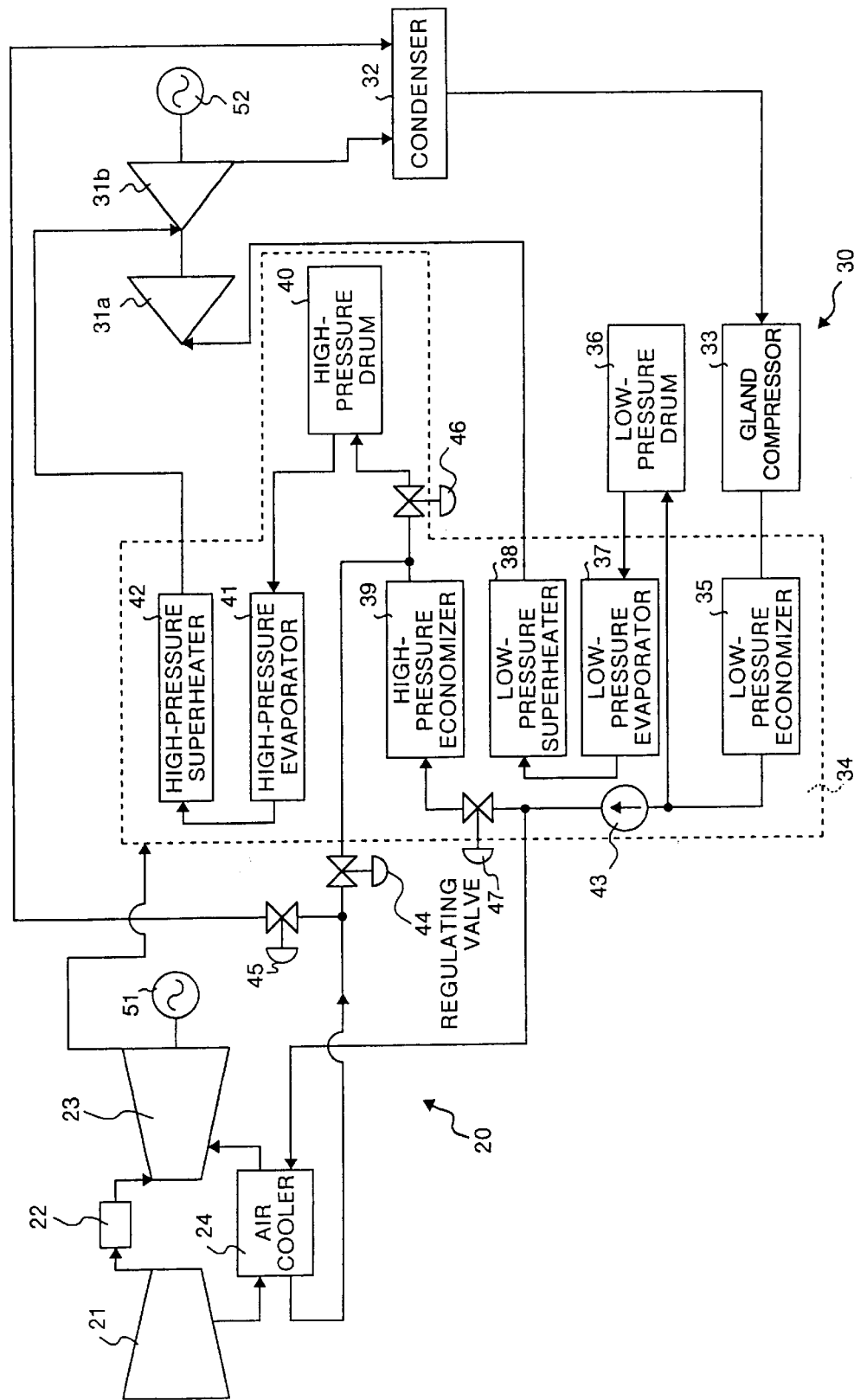
FIG. 2 is a diagram that shows a second embodiment of the gas turbine combined plant.

FIG. 2 is a block diagram that shows a second embodiment of the gas turbine combined plant according to the present invention. Based on the gas turbine combined plant 10 relating to the first embodiment, a regulating valve 47 that regulates a flow rate of the water flowing through a water supply passage is further provided. More specifically, this valve 47 is provided in the water supply passage downstream from the branch passage to the air cooler 24 in the water supply passage that supplies the water to the entrance of the high-pressure economizer 39.

According to the gas turbine combined plant 10 of this embodiment, it is possible to adjust a relative flow rate ratio between a flow rate of the water flowing to the high-pressure economizer 39 and a flow rate of the water flowing to the air cooler 24, by adjusting the opening of the regulating valve 47. Therefore, it is possible to increase the flow rate of the water that flows to the air cooler 24, by making smaller the opening of this regulating valve 47 and by making larger the opening of the regulating valve 44. Consequently, it is possible to improve the cooling performance of the air cooler 24 that cools high-temperature air. On the other hand, it is possible to reduce the flow rate of the water that flows to the air cooler 24, by making smaller the opening of the regulating valve 44 and by making larger the opening of the regulating valve 47. Consequently, it is possible to restrict the cooling performance of the air cooler 24 that cools high-temperature air. As a result, it is possible to control the temperature of the high-temperature air that is cooled by the air cooler 24 according to the openings of the regulating valves 44 and 47.

During the normal operation time, it is also possible to adjust a relative flow rate ratio between a flow rate of the water that flows to the high-pressure economizer 39 and a flow rate of the water that flows to the air cooler 24, by only the regulating valve 44 that is provided in the water passage that joins the exit drawn water of the high-pressure economizer 39 from the air cooler 24. By only this regulating valve 44, it is difficult to relatively increase the quantity of the water that flows to the air cooler 24. However, it is possible to optionally adjust a fed water quantity ratio between the water that flows to the high-pressure economizer 39 and the water that flows to the air cooler 24, by adjusting the opening through linked operation of the regulating valve 44 and the regulating valve 47. Therefore, it is particularly possible to improve the temperature controllability for increasing the cooling performance of the air cooler 24. At the same time, it is possible to increase the flow rate controllability of the regulating valve 44.

Figure 3:
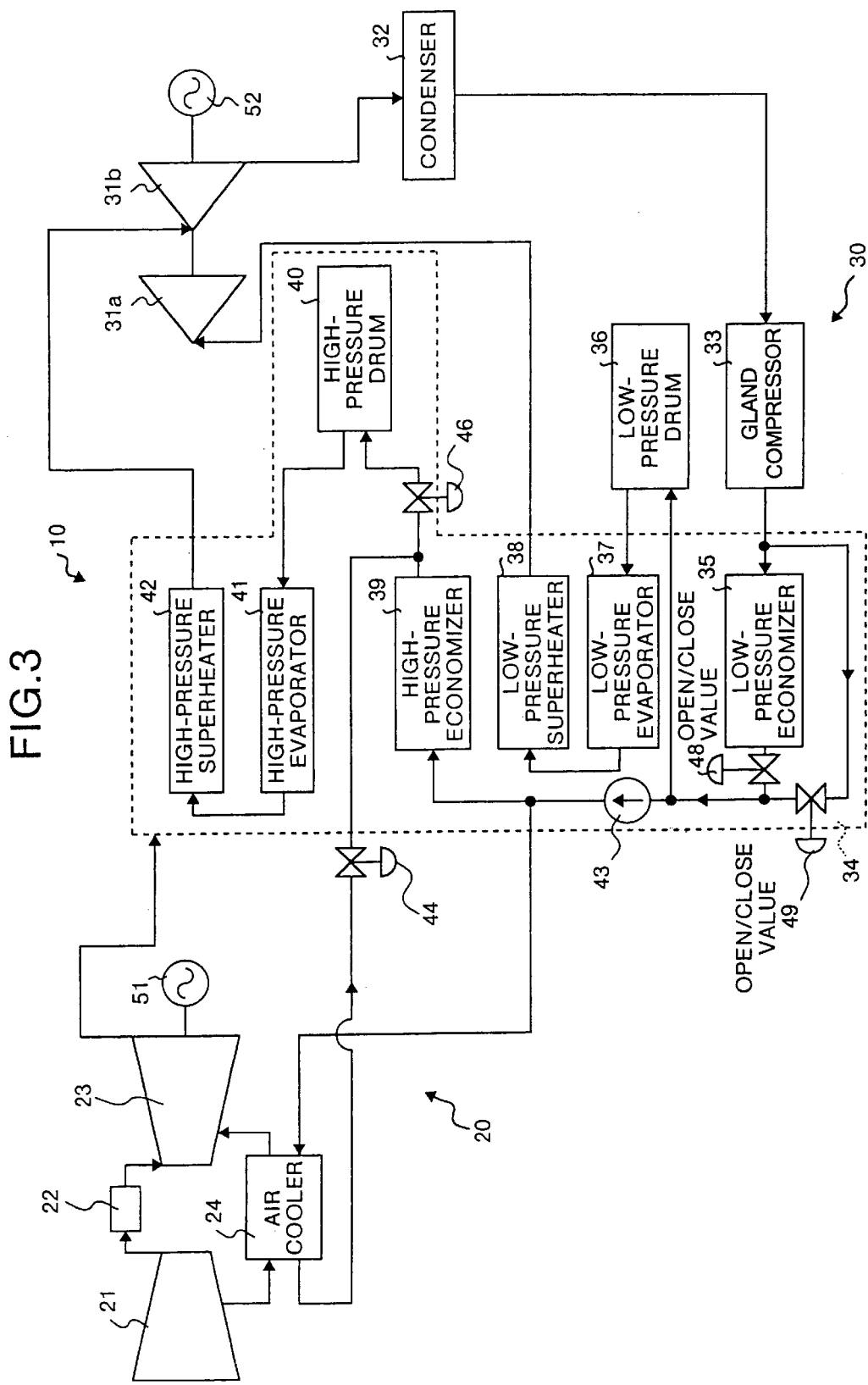
FIG. 3 is a diagram that shows a third embodiment of the gas turbine combined plant.

FIG. 3 is a block diagram that shows a third embodiment of the gas turbine combined plant according to the present invention. Based on the gas turbine combined plant 10 relating to the first embodiment, a water supply passage is provided in place of the passage for the water that branches from the air cooler 24 to the condenser 32. The water supply passage directly joins the water fed to the entrance of the low-pressure economizer 35 from the gland condenser 33 and bypasses the low-pressure economizer 35. At the same time, an open/close valve 49 that opens and closes this bypass passage is provided in the bypass passage. Further, an open/close valve 48 that opens and closes a passage that flows through the low-pressure economizer 35 is provided at an upstream position from a position where the bypass passage joins the exit side water supply passage of the low-pressure economizer 35.

When one of the open/close valve 48 and the open/close valve 49 is opened, the other valve is closed. This works as a switching unit that switches the valve so that the water from the gland condenser 33 flows to only one of the low-pressure economizer 35 and the bypass passage.

In other words, during the normal operation time, the open/close valve 48 is kept opened and the open/close valve 49 is kept closed, and all the water from the gland condenser 33 passes through the low-pressure economizer 35 without passing through the bypass passage. The pressure of the water drawn from the exit of this low-pressure economizer 35 is increased by the water supply pump 43 and is supplied to the air cooler 24.

On the other hand, during the load disconnection time of the steam turbines 31a and 31b, a difference of the water pressure between the exit and the entrance of the air cooler 24 is small. Therefore, when the quantity of the water that flows to the air cooler 24 is reduced, the open/close valve 48 of the passage at the exit side of the low-pressure economizer 35 is closed, and the open/close valve 49 of the bypass passage is opened. With this arrangement, the water that flows to the air cooler 24 is switched from the water drawn from the exit to the water fed to the entrance of the low-pressure economizer 35. Based on this, the water that flows into the air cooler 24 (the water fed to the entrance of the low-pressure economizer 35) becomes at a lower temperature than that the water during the normal operation time (the water drawn from the exit of the low-pressure economizer 35). Therefore, even when the flow rate of the water is reduced, it is possible to prevent insufficient cooling performance of the air cooler 24 that cools the high-temperature air.

This embodiment has a structure that the water from the gland condenser 33 is allowed to pass through the low-pressure economizer 35 or to bypass the low-pressure economizer 35 by opening/closing the two open/close valves 48 and 49 through linked operation of these valves. In place of these two open/close valves 48 and 49, it is also possible to provide a single switching valve that selectively passes the water through one of the water supply passages, at a branching point or a joining point of the water supply passages.

Further, the two open/close valves 48 and 49 may be changed to regulating valves that can continuously regulate the openings respectively. The openings of the regulating valves may be continuously changed respectively according to the temperature of air cooled by the air cooler 24, and the openings may be regulated so that the temperature of this air becomes a predetermined temperature.

Figure 4:
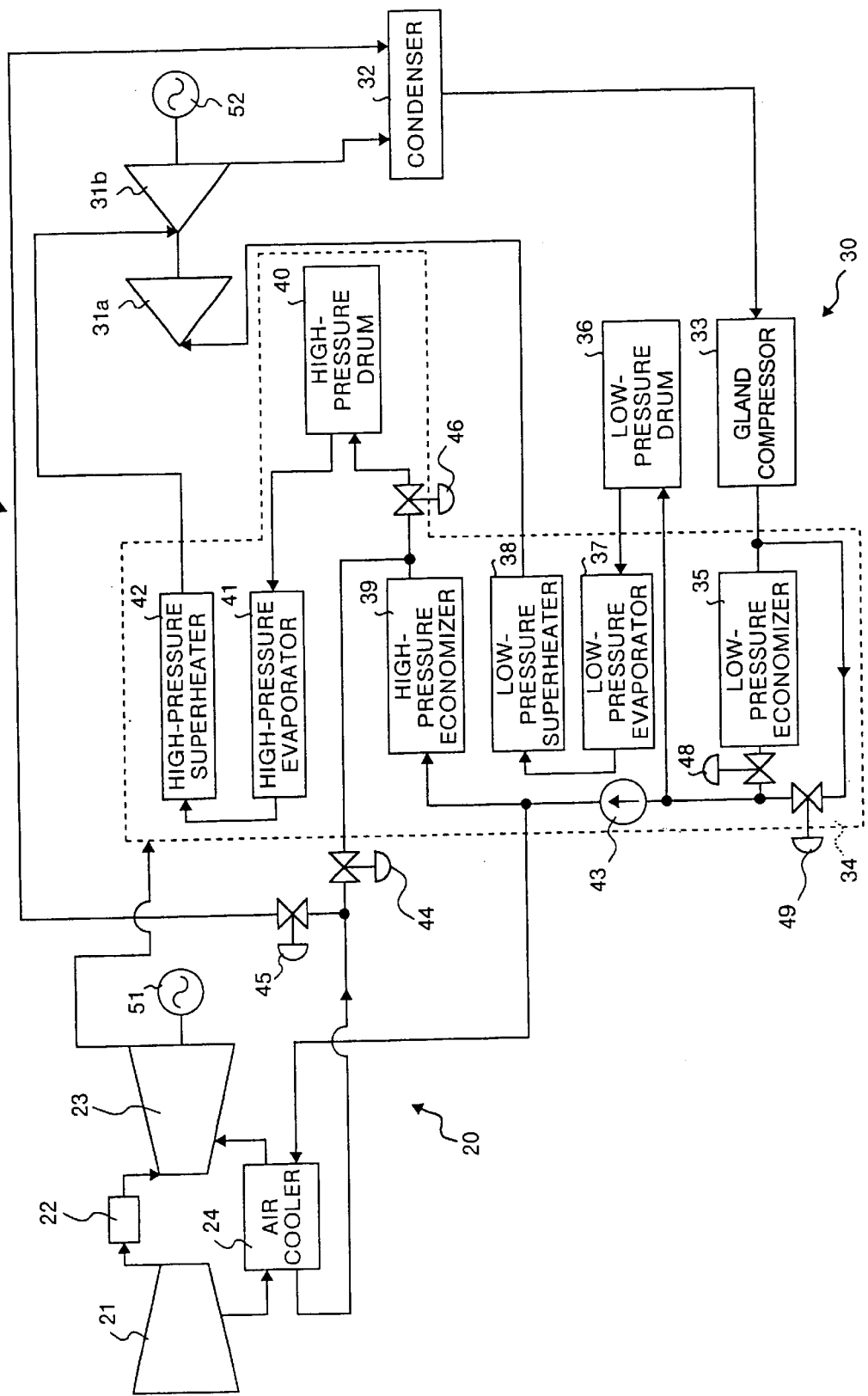
FIG. 4 is a diagram that shows a fourth embodiment of the gas turbine combined plant.
Figure 5:
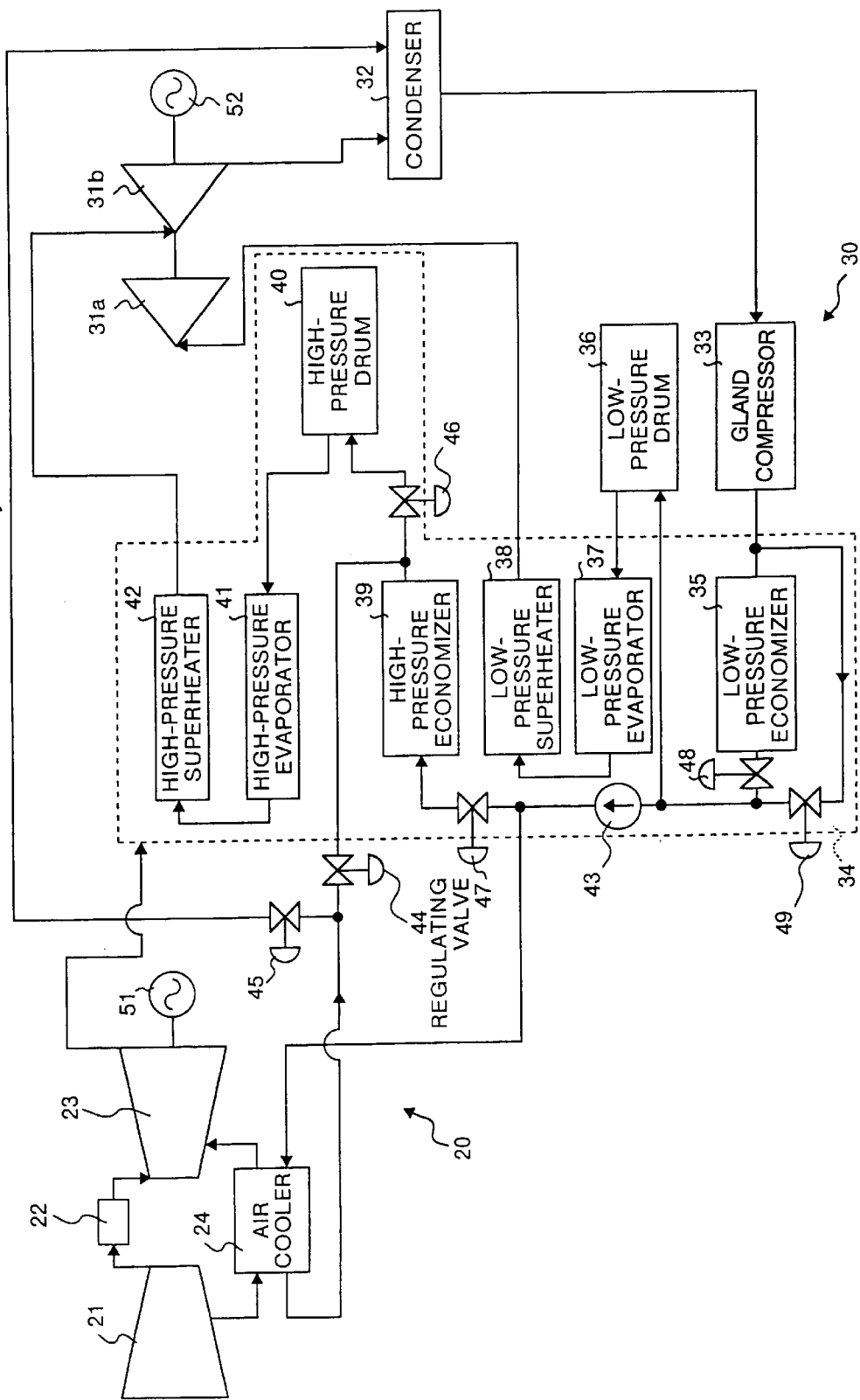
FIG. 5 is a diagram that shows a fifth embodiment of the gas turbine combined plant.

The gas turbine combined plant according to the present invention is not limited to the above embodiments. For example, it is also possible to apply an embodiment that is a combination of the gas turbine combined plant 10 relating to the first embodiment and the gas turbine combined plant 10 relating to the third embodiment, as shown in FIG. 4. It is also possible to apply an embodiment that is a combination of the gas turbine combined plant 10 relating to the second embodiment and the gas turbine combined plant 10 relating to the third embodiment, as shown in FIG. 5. In the former case, it is possible to obtain both the effect of the gas turbine combined plant 10 relating to the first embodiment and the effect of the gas turbine combined plant 10 relating to the third embodiment. In the latter case, it is possible to obtain both the effect of the gas turbine combined plant 10 relating to the second embodiment and the effect of the gas turbine combined plant 10 relating to the third embodiment.

As explained above, according to the gas turbine combined plant as one aspect of this invention, when a pressure difference between the primary side and the secondary side of the cooling water passage is small at a steam turbine starting time and a load disconnection time, a large opening is taken for the regulating valve that is provided in the branch passage leading to the condenser in a substantially vacuum status. With this arrangement, the water (cooling water) that has been guided to the air cooler flows into the condenser through the branch passage. Therefore, it is possible to secure a sufficient quantity of the water that flows through the air cooler, and it is possible to prevent insufficient cooling of high-temperature air. On the other hand, during the normal operation of the steam turbine, the opening of the regulating valve is narrowed (the valve may be closed completely). With this arrangement, most of the water that has been guided to the air cooler (all the water when the regulating valve has been closed completely) is returned to the waste-heat recovery boiler after passing through the secondary side of the cooling passage. As this water is returned to a process at a higher temperature than that of the primary side of the cooling passage (for example, the exit of the economizer), it is possible to circulate the water to be fed with sufficient thermal efficiency like the conventional practice.

Moreover, the water that has become at a high temperature after passing through the air cooler is drained by joining the water drawn from the exit that is at a higher temperature than that of the water fed to the entrance of the economizer. With this arrangement, it is possible to increase the thermal efficiency within the system.

Furthermore, when the opening of the second regulating valve is narrowed or is completely closed, it is possible to reduce the quantity of the water that flows through this economizer. As a result, it is possible to relatively increase the quantity of the water that is branched to the primary side of the cooling water passage that leads to the air cooler. Further, it is possible to improve temperature controllability of the high-temperature air that is cooled by the air cooler. At the same time, it is possible to increase flow rate controllability of other regulating valves that are provided at the downstream of the economizer.

Moreover, when a pressure difference between the primary side and the secondary side of the cooling water passage is small at a steam turbine starting time and a load disconnection time, the switching valve is switched to the bypass passage side. With this operation, the water to the primary side of the cooling water passage is stopped, and water at a lower temperature than that of the water at the primary side of the cooling water passage is guided into the air cooler from the bypass passage. Therefore, it is possible to further increase the cooling performance of the air cooler.

Furthermore, as the water at a lower temperature than that of the water fed to the entrance of the high-pressure side economizer that is the water fed to the primary side of the cooling water passage, the water fed to the entrance of the low-pressure side economizer is applied. With this arrangement, it is possible to easily obtain the water at a lower temperature from the waste-heat recovery boiler that has a multi-stage economizer.

According to the gas turbine combined plant as another aspect of this invention, when a pressure difference between the primary side and the secondary side of the cooling water passage is small at a steam turbine starting time and a load disconnection time, the quantity of water that passes through the air cooler is reduced. However, by switching the switching valve to the bypass passage side, the water at a lower temperature than that at the primary side of the cooling water passage is supplied to the air cooler from the bypass passage, not from the primary side of the cooling water passage. Therefore, the cooling efficiency of the air cooler is further improved than that of the conventional practice, and it is possible to prevent insufficient cooling of high-temperature air. On the other hand, during the normal operation of the steam turbine, the switching valve is switched to the primary side of the cooling water passage. As a result, the water is supplied to the air cooler from the primary side of the cooling water passage, in a similar manner to that of the conventional practice, and it is possible to carry out suitable cooling according a flow rate of the water.

Furthermore, when the exit drawn water of the economizer is used as the primary side of the cooling water passage, the water fed to the entrance of the economizer is at a lower temperature than that of the water drawn from the exit thereof. Therefore, by using the water fed to the entrance as the water fed to the bypass passage, it is possible to easily obtain the water at a lower temperature from the waste-heat recovery boiler that has the economizer.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A gas turbine combined plant comprising:
   a gas turbine section which includes an air compressor, a combustor, a gas turbine, and an air cooler that cools high-temperature air obtained by being extracted from the air compressor and supplies cooled air for cooling high-temperature members in the gas turbine;
   a steam turbine section which includes a waste-heat recovery boiler that generates steam based on waste heat of an exhaust gas exhausted from the gas turbine, a steam turbine that is driven by the steam to exhaust the steam, and a condenser that condenses the steam exhausted from the steam turbine into water and supplies the water to the waste-heat recovery boiler;
   a cooling water passage that guides apart of the water from the waste-heat recovery boiler into the air cooler, allows heat-exchange between the water and the high-temperature air, and returns the water heated due to the heat exchange to the waste-heat recovery boiler;
   a branch passage that guides the water heated due to the heat exchange to the condenser; and
   a condenser valve that regulates a quantity of the water that flows through the branch passage.

2. The gas turbine combined plant according to claim 1, wherein the cooling water passage guides a part of the water that is fed to an entrance of an economizer in the waste-heat recovery boiler, into the air cooler to heat-exchange the water with the high-temperature air, and drains the water after the heat exchange by joining the water fed to the entrance and drawn from an exit of the economizer.

3. The gas turbine combined plant according to claim 2, wherein an economizer valve that regulates a quantity of the water that passes through the economizer and that relatively increases or decreases a quantity of the water that is guided into the air cooler, is provided between the exit and the entrance of the economizer.

4. The gas turbine combined plant according to claim 1, further comprising a bypass passage that guides water at a lower temperature than that of water at a primary side of the cooling water passage, into the air cooler; and a switching valve that selectively switches between the primary side of the cooling water passage and the bypass passage.

5. The gas turbine combined plant according to claim 4, wherein the waste-heat recovery boiler has a high-pressure side economizer, and a low-pressure side economizer that is provided at the upstream of the high-pressure side economizer, the cooling water passage guides a part of the water fed to an entrance of the high-pressure side economizer into the air cooler, where the water is heat-exchanged with the high-temperature air, and drains the water after the heat exchange by joining the water drawn from the exit of the high-pressure side economizer, and the bypass passage guides a part of the water fed to an entrance of the low-pressure side economizer into the air cooler.

6. A gas turbine combined plant comprising:
   a gas turbine section which includes an air compressor, a combustor, a gas turbine, and an air cooler that cools high-temperature air obtained by being extracted from the air compressor and supplies cooled air for cooling high-temperature members in the gas turbine;
   a steam turbine section which includes a waste-heat recovery boiler that generates steam based on waste heat of an exhaust gas exhausted from the gas turbine, a steam turbine that is driven by the steam, and a condenser that condenses the steam exhausted from the steam turbine into water and supplies the water to the waste-heat recovery boiler;
   a cooling water passage that guides a part of the water from the waste-heat recovery boiler into the air cooler, allows heat-exchange between the water and the high-temperature air, and returns the water after this heat exchange to the waste-heat recovery boiler;
   a bypass passage that guides water at a lower temperature than that of water at a primary side of the cooling water passage, into the air cooler; and
   a switching valve that selectively switches between the primary side of the cooling water passage and the bypass passage.

7. The gas turbine combined plant according to claim 6, wherein the primary side of the cooling water passage guides a part of water drawn from an exit of an economizer in the waste-heat recovery boiler into the air cooler, and the bypass passage guides a part of water fed to the entrance of the economizer into the air cooler.

* * * * *